(12) United States Patent
Proksa et al.

(10) Patent No.: US 7,394,927 B2
(45) Date of Patent: Jul. 1, 2008

(54) ITERATIVE METHOD OF DETERMINING A SPATIAL DISTRIBUTION OF VALUES OF A PROPERTY

(75) Inventors: Roland Proksa, Hamburg (DE); Thomas Köhler, Norderstedt (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 58 days.

(21) Appl. No.: 10/555,576

(22) PCT Filed: Apr. 26, 2004

(86) PCT No.: PCT/IB2004/050507

§ 371 (c)(1),
(2), (4) Date: Sep. 12, 2006

(87) PCT Pub. No.: WO2004/100070

PCT Pub. Date: Nov. 18, 2004

(65) Prior Publication Data

US 2007/0003132 A1    Jan. 4, 2007

(30) Foreign Application Priority Data

May 6, 2003  (EP)  .................................. 03101249

(51) Int. Cl.
*G06K 9/00* (2006.01)
(52) U.S. Cl. ........................ 382/154; 382/128; 382/255; 382/131; 324/307; 324/309; 324/318; 324/319
(58) Field of Classification Search ................ 382/154, 382/131, 128, 255; 378/4; 364/413.19; 324/307, 324/309, 318, 319
See application file for complete search history.

(56) References Cited

U.S. PATENT DOCUMENTS

| | | | | |
|---|---|---|---|---|
| 4,984,160 A | * | 1/1991 | Saint Felix et al. | 378/62 |
| 5,253,171 A | | 10/1993 | Hsiao et al. | 364/413.19 |
| 5,909,476 A | | 6/1999 | Cheng et al. | 378/4 |
| 6,101,236 A | | 8/2000 | Wang et al. | 378/4 |
| 6,320,928 B1 | | 11/2001 | Vaillant et al. | 378/4 |
| 6,600,801 B2 | * | 7/2003 | Raupach | 378/4 |

(Continued)

OTHER PUBLICATIONS

Globally Convergent Algorithms for maximum a posteriori transmission tomography, IEEE 1995.*

(Continued)

*Primary Examiner*—Andrew W. Johns
*Assistant Examiner*—Nancy Bitar

(57) ABSTRACT

An iterative method determines a spatial distribution of values of a property of an object, and particularly values of its absorption, in an examination region, on the basis of measured values that values are acquired with a measuring device, and particularly with a computer tomograph. The reliability of each measured value is taken into account when this is done. The measured values can each be represented as a sum of values of the property that have each been multiplied by a proportional factor, the proportional factor being a measure of the proportion that a value of the property forms of the measured value. Each value of the property is approached by one iteration value at a time by setting each iteration value to a starting value and, in an iteration step, generating for each measured value a reference measured value, forming the difference between each reference measured value and the corresponding measured value, and multiplying this difference by a reliability parameter and projecting it backward into the examination region.

10 Claims, 2 Drawing Sheets

U.S. PATENT DOCUMENTS

Figure 1:
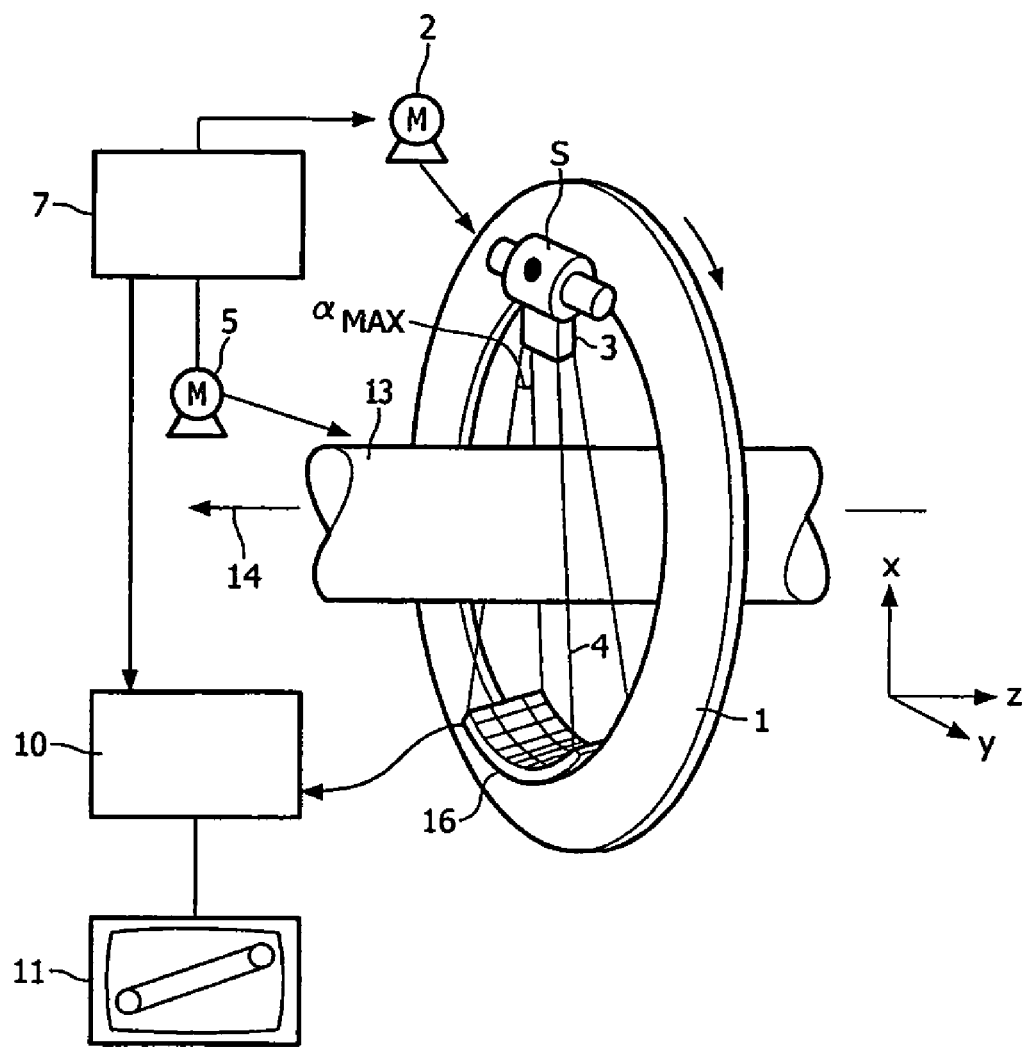

| | | | |
|---|---|---|---|
| 6,754,297 B2 * | 6/2004 | James | 378/4 |
| 6,986,604 B2 * | 1/2006 | Sembritzki | 378/207 |
| 7,202,663 B2 * | 4/2007 | Huang | 324/307 |
| 2008/0063247 A1 * | 3/2008 | Griswold | 382/128 |

OTHER PUBLICATIONS

Algebraic reconstruction technique can be made by computationally efficient, IEEE 1993.*

Algebraic Reconstruction Techniques Can Be Made Computationally Efficient, Hermon et al, IEEE.*

Herman, G.T., et al.; Algebraic Reconstruction Techniques Can be Made Computationally Efficient; 1993; IEEE Trans. On Medical Imaging; 12(3)600-609.

Lange, K., et al.; Globally Convergent Algorithms for Maximum a posteriori Transmission Tomography; 1995; IEEE Trans. On Image Processing; 4(10)1430-1450.

Schmidlin, P., et al.; Computation of High Overrelaxation Parameters in Iterative Image Reconstruction; 1998; IEEE Trans. On Nuclear Medicine; 45(3)1737-1742.

* cited by examiner

ITERATIVE METHOD OF DETERMINING A SPATIAL DISTRIBUTION OF VALUES OF A PROPERTY

The invention relates to an iterative method of determining a spatial distribution of values of a property of an object, and particularly values of its absorption, in an examination region, from measured values that are acquired with a measuring device, and particularly with a computer tomograph, in which method account is taken of the reliability of each measured value. The invention also relates to a computer tomograph for performing the method and to a computer program for controlling the computer tomograph.

In the context of the present invention, the reliability of a measured value is a measure of how well the measured value reflects the property that is to be measured, i.e., in computer tomography for example, how well it reflects the sum of the values of the absorption of an object along a ray, or in other words the intensity of a ray that has been reduced in this way. For example, the reliability of measured values that are severely affected by noise is less than that of measured values that are less severely affected by noise.

A known method of the kind specified in the opening paragraph is the computer tomography method that is described in "Globally convergent algorithms for maximum a posteriori transmission tomography", K. Lange, J. A. Fessler, IEEE Transactions on Image Processing, 4(10): 1430-1450 1995, in which a beam of rays is transmitted through an examination region along a circular or helical trajectory and the distribution of absorption in the examination region is reconstructed iteratively from the values measured. To enable account to be taken of the reliability of the measured values in this method, all the measured values whose rays passed through a voxel in the examination region during the measurement process have to be taken into account in an iteration step to allow the voxel concerned to be updated, which means that the amount of computing work for reconstructing a voxel, and hence for determining the distribution of absorption, is very large.

It is an object of the present invention to specify an iterative method of the kind stated in the opening paragraph, in which the computing work is reduced in comparison with known methods.

This object is achieved in accordance with the invention by an iterative method of determining a spatial distribution of values of a property of an object, and particularly values of its absorption, in an examination region, starting from measured values that are first acquired with a measuring device, and particularly with a computer tomograph, wherein the measured values can each be represented as a sum of values of a property that have each been multiplied by a proportional factor, which measured values are divided into groups, and wherein the proportional factor is a measure of the proportion that a value of the property forms of the measured value, and each value of the property is approached by one iteration value at a time by setting each iteration value to a starting value and performing the following steps at least once on each group of measured values until a break-off criterion is satisfied:

a) generating a reference measured value for each measured value in the given group, by multiplying each iteration value whose value of the property forms a proportion of the given measured value by a proportional factor and by adding up the iteration values that are multiplied by the given proportional factor, b) generating a measured value difference for each measured value in the given group by forming the difference between the given measured value and the corresponding reference measured value, c) multiplying each measured value difference by a reliability parameter that is larger the greater is the reliability of that measured value in the group which belongs to the given measured value difference, d) dividing each measured value difference that has been multiplied by the reliability parameter by a normalizing factor that is dependent on the proportional factors of those values of the property which form a proportion of that measured value which belongs to the measured value difference, e) updating the distribution by backward projection of the measured value differences obtained in step d) into the examination region.

The groups preferably each comprise the same number of measured values. Each group may comprise one measured value, or also a plurality of measured values and in particular all the measured values. Iteration values may, for example, be voxel values for voxels that represent the examination region. Examples of proportional factors are given below.

Measured values can each be represented as a sum of values of a property that have each been multiplied by a proportional factor, if they can be at least approximated by a sum of this kind. In this way, in computer tomography for example, a measured value can be represented as a function of a sum of values of absorption when the values have been multiplied by a proportional factor.

To update the distribution of iteration values in step e), the measured value differences obtained in step d) are projected backward into the examination region. In this way, those iteration values are updated whose values of the property have contributed to the measured values in the given group. If computer tomography is considered for example, in which a distribution of absorption is to be approximated by a distribution of voxel values and each group has only one measured value or ray then, in an iteration step e), all the voxel values are updated that have contributed to the particular measured value, i.e. through which the given ray has passed. Hence, to update these voxel values, no further measured values are needed apart from this particular measured value. In comparison with known methods in which all the measured values whose rays have passed through a voxel have to be taken into account to allow the value of the voxel to be updated, this considerably reduces the computing work required for determining the spatial distribution.

These and other aspects of the invention are apparent from and will be elucidated with reference to the embodiments described hereinafter.

Figure 2:
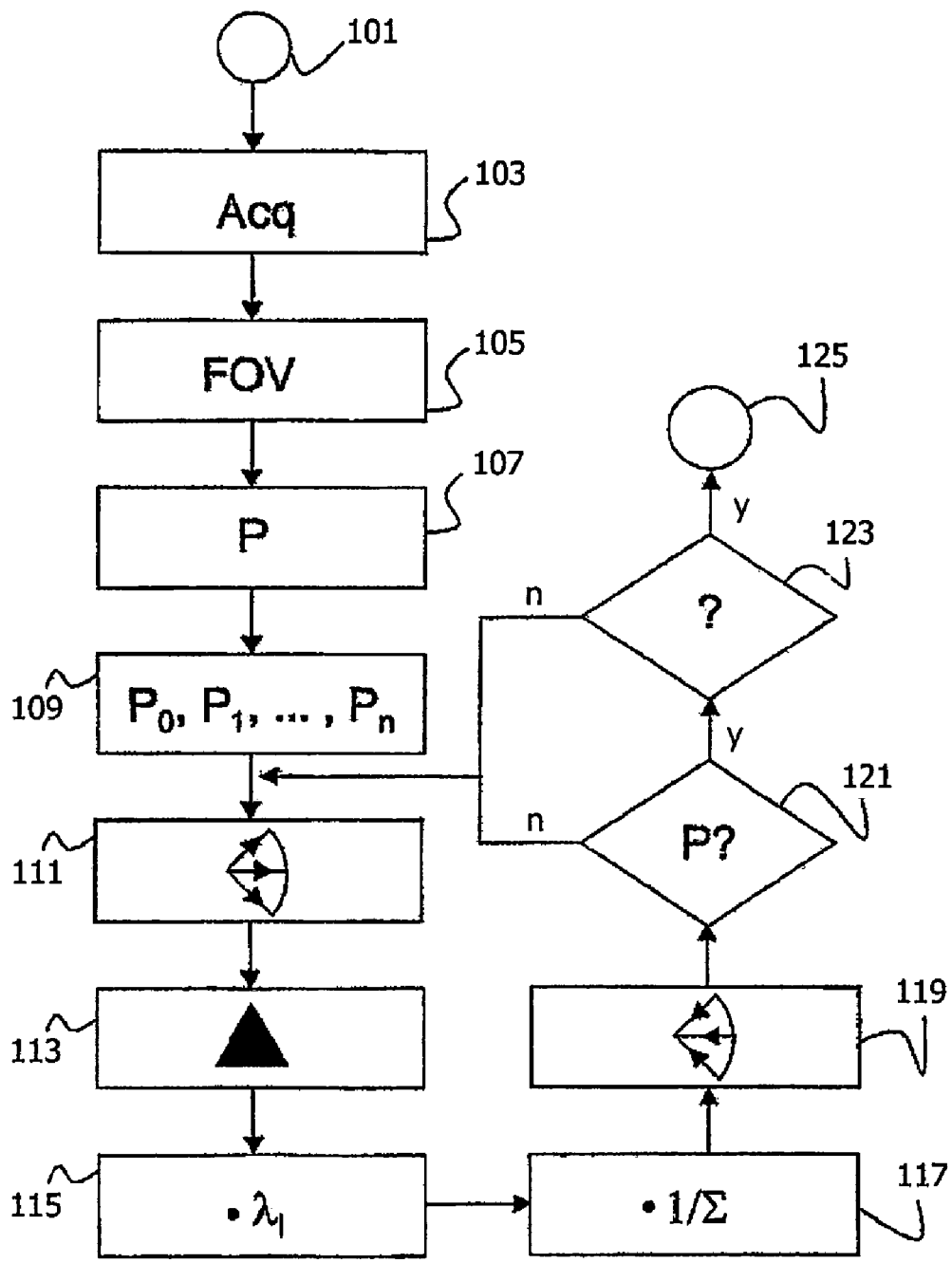

In the drawings:

FIG. 1 shows a computer tomograph with which the method according to the invention can be performed, and FIG. 2 is a flow chart of the method according to the invention.

The computer tomograph shown in FIG. 1 comprises a gantry 1 which is able to rotate about an axis of rotation 14 extending parallel to the z direction of the coordinate system shown in FIG. 1. For this purpose, the gantry 1 is driven by a motor 2 at an angular velocity that is preferably constant, but adjustable. Fastened to the gantry 1 is a radiation source S such as an X-ray generator, for example. This is provided with a collimator arrangement 3 that extracts from the radiation produced by the radiation source S a conical beam of rays 4, i.e. a beam of rays that is of a finite extent other than zero both in the z direction and in a direction perpendicular thereto (i.e.

in a plane perpendicular to the axis of rotation). In other embodiments, the beam of rays could also comprise a fan of rays.

The beam of rays 4 passes through a cylindrical examination region 13 in which an object, e.g. a patient on a patient presentation table (neither of which is shown), may be situated.

Having passed through the examination region 13, the beam of rays 4 impinges on a detector unit 16 fastened to the gantry 1, which detector unit 16 has a detecting area that comprises a plurality of detector elements that, which in this embodiment, are arranged in the form of a matrix in rows and columns. The columns of detector elements preferably extend parallel to the axis of rotation 14. The rows of detector elements are situated in planes perpendicular to the axis of rotation and, in this embodiment, are situated on an arc about the radiation source S (thus forming a focus-centered detector unit). In other embodiments however, they may be configured differently, e.g. describe an arc about the axis of rotation 14 or be in a straight line. In any position of the radiation source, each detector element on which the beam of rays 4 impinges gives a measured value for one ray from the beam of rays 4.

The included angle of the beam of rays 4, which is designated $\alpha_{max}$, determines the diameter of the object cylinder within which the object being examined is situated when the measured values are being acquired. The included angle is defined in this case as the angle that is made with a plane defined by the radiation source S and the axis of rotation 14 by a ray that, a plane perpendicular to the axis of rotation 14, is situated at the edge of the beam of rays 4. The examination region 13, i.e. the object or the patent presentation table, can be displaced by means of a motor 5 parallel to the axis of rotation 14, i.e. to the z axis. However, to give an equivalent action, the gantry could equally well be displaced in this direction. When the object is a technical one rather than a patient, it can be rotated in the course of an examination while the radiation source S and the detector unit 16 remain stationary.

By means of the motors 2 and 5, the radiation source S and the detector unit 16 are able to follow a trajectory relative to the examination region 13 that extends over the surface of an imaginary cylinder. This trajectory may, for example, extend along a helical path when both motors are operating. A circular trajectory can be obtained if the motor 5 for the advance in the direction of the axis of rotation 14 remains stopped and the motor 2 causes the gantry to rotate. In the present embodiment, only the helical trajectory will be considered.

The measured values acquired by the detector unit 16 are fed to a reconstructing and image-processing computer 10 that is connected to the detector unit 16 by, for example, a contactless data transmission system (not shown). The reconstructing and image-processing computer 10 reconstructs the distribution in the examination region 13 of the values of a property, which are values of absorption in the present case, and reproduces them, on a monitor 11, for example. The two motors 2 and 5, the reconstructing and image-processing computer 10, the radiation source S and the transfer of the measured values from the detector unit 16 to the reconstructing and image-processing computer 10 are controlled by a control unit 7.

In other embodiments, the measured values acquired may be fed, for reconstruction purposes, first to one or more reconstructing computers, that then pass the reconstructed data on to an image-processing computer, e.g. via a glass-fiber cable.

FIG. 2 shows the course of a method of measurement and reconstruction that can be performed with the computer tomograph shown in FIG. 1.

After initialization in step 101, the gantry rotates at an angular velocity that is constant in the present embodiment. The velocity may however equally well vary, e.g. as a function of time or of the position of the radiation source.

In step 103, the examination region, i.e. the object or the patient presentation table, is displaced parallel to the axis of rotation and the radiation from the radiation source S is switched on, thus enabling the detector unit 16 to detect the radiation in a plurality of angular positions.

To elucidate the subsequent steps, a mathematical description of the reconstruction will now be inserted.

The intensity I(L) of a ray that has passed through the examination region, i.e. the object, can be defined as $$I(L) = I_0 \exp\left(-\int_L \mu(x)dx\right). \tag{1}$$

In this equation, $I_0$ is the intensity of the ray concerned before it passes through the examination region, L is the line from the radiation source to that detector element by which the intensity I(L) is detected, i.e. the path of the ray concerned, and $\mu(x)$ is the absorption at a point x in the examination region.

The measured value p(L) that results from the detection of the intensity depends on the intensity and may, for example, be given by the following equation:

$$p(L) = \int_L \mu(x)dx = -\ln(I(L)/I_0). \tag{2}$$

The image dataset to be reconstructed, i.e. the distribution of absorption to be reconstructed, is represented by M voxels. The image dataset comprises for example $512^3$ voxels that each occupy a volume of 1 $mm^3$.

If a vector p having N elements is now introduced, where each element $p_j$ of the vector represents a measured value given by equation (2), and if there is also introduced a vector $\mu$ whose M elements $u_i$ each represent a value of absorption for a voxel belonging to an image dataset, then the generation of the measured values by transmission through the examination region is defined by $$p = A\mu \tag{3}$$

In this equation, A is a discrete version of the integration operator in accordance with equation (2). Hence, for each measured value $p_j$, the matrix A defines how this measured value is obtained by the addition of values of absorption $\mu_i$. Any matrix A that meets this requirement may be used in accordance with the invention. A measured value $p_j$ could, for example, easily be obtained by adding those values of absorption $\mu_i$ which are arranged along the ray that caused the measured value $p_j$. The matrix would then comprise only zeroes and ones that were arranged at the corresponding points in the matrix A.

The object of the reconstruction is therefore to solve equation (3) for $\mu$. What therefore has to be solved is a system of linear equations containing M unknowns and N equations. What is problematic in this case is the large number of unknowns and equations. If a radiation source performs 10 revolutions about an examination region, if 1500 measured values are acquired per revolution and detector element, and if there are 10,000 detector elements, the number of equations is $N = 1.5 \cdot 10^8$. Also, as has already been mentioned above, M is of the order of $512^3$. Systems of linear equations of this kind can be solved iteratively with the algebraic reconstruction technique (ART) that is known from, inter alia, "Algebraic reconstruction techniques (ART) for three-dimensional electron microscopy and x-ray photography", Journal of Theoretical Biology, F. Gordon, R. Bender, G. T. Herman, 29:471-481, 1970 and that will be described below.

The ART uses the iteration formula $$\mu_i^{k+1} = \mu_i^k + \lambda \frac{p_l - \sum A_{lj}\mu_j^k}{\sum A_{lj}^2} A_{li}. \quad (4)$$

In this equation, $\mu_i^{k+1}$ is the iteration value of the ith voxel in the image dataset after k+1 iterations. $\mu_i^k$ is therefore the iteration value of the ith voxel after k iterations. As the application of equation (4) continues, the given iteration value $\mu_i^k$ approaches the corresponding actual value of absorption $\mu_i$. Also, $\lambda$ denotes a relaxation parameter that affects the convergence rate of the method and is constant. In known methods it is generally approximately equal to 1. In the sum $\Sigma A_{lj}\mu_j^k$, all the iteration values $\mu_j^k$ whose values of absorption $\mu_j$ have contributed to the measured value $p_l$, i.e. those iteration values through whose voxel the ray concerned has passed, are added up. Each iteration value is weighted with $A_{lj}$ when this is done. The matrix element $A_{lj}$ states how large the contribution is that is made to the measured value $p_l$ by that value of absorption $\mu_j$ which corresponds to the iteration value $\mu_j^k$. In a simple case, $A_{lj}$ may for example be equal to 1 when the ray that caused the measured value $p_l$ did pass through the voxel having the iteration value $\mu_j^k$, and $A_{lj}$ may be equal to 0 when the said ray did not pass through the voxel in question. Hence, $A_{lj}$ gives the proportion that the value of absorption $\mu_j$ forms of the measured value $p_l$. The term $\Sigma A_{lj}^2$ is a sum covering all the squares of the matrix elements $A_{lj}$ for a fixed l and represents a normalization that will be explained below. The summations in equation (4) take place across the index j.

The idea on which the invention is based comprises adjusting the relaxation parameter for each measured value in line with the latter's reliability. A measured value has a low reliability if, for example, it is severely affected by noise. In a reconstruction, measured values of different reliabilities can also result from objects that move periodically. What are used in a reconstruction of this kind are generally only measured values that were acquired during certain low-movement phases of the movement of the object. However, even during the low-movement phases the object moves by differing amounts. Measured values that were acquired during a movement of the object that was, as far as the low-movement phase was concerned, relatively large, may be of lower reliability than measured values whose acquisition times correlated with a relatively small movement by the object.

The relaxation parameter $\lambda$, whose value is the same for all the measured values, is therefore replaced in equation (4) by a new reliability parameter $\lambda_l$ that is a function of the reliability of the corresponding measured value $p_l$. The greater the reliability of the measured value $p_l$, the larger is the parameter $\lambda_l$ selected to be. This gives the following iteration rule for solving equation (3):

$$\mu_i^{k+1} = \mu_i^k + \lambda_l \frac{p_l - \sum A_{lj}\mu_j^k}{\sum A_{lj}^2} A_{li}. \quad (5)$$

It can be seen from equation (5) that only one measured value $p_l$ is required for the updating of an iteration value $\mu_i^k$ at a point $x_i$ in the examination region whereas, as was mentioned at the beginning, it is necessary in known iterative methods that take account of the reliability of the measured values for all the measured values whose rays passed through the relevant point $x_i$ in the examination region to be looked at for the purpose of updating an iteration value $\mu_i^k$. Reconstruction by equation (5) therefore gives an appreciably reduced amount of computing work.

The method according to the invention is oriented to equation (5). What this means is that, for an iteration value $\mu_i^k$ to be updated in an iteration step, a reference measured value $\Sigma A_{lj} \mu_j^k$ has to be generated, essentially by adding iteration values that were determined in the last iteration step. This reference measured value is subtracted from the relevant measured value $p_l$. The difference is then multiplied by a reliability parameter $\lambda_l$ and added to the iteration value $\mu_i^k$. Although it is preferable for account to be taken of the terms $A_{lj}$ and $\Sigma A_{lj}^2$, the method according to the invention can equally well be used when other proportional factors and normalizations are used in place of these terms.

The adding of a measured value difference that has been multiplied by a proportional factor and normalized can be referred to as backward projection. A measured value difference can then be added to one iteration value, or a measured value difference can be added to all the iteration values that contributed to the measured value difference.

The use in accordance with the invention of equation (5) is not confined to measured values from a computer tomograph or to the determination of the distribution of values of absorption. Equation (5) can in fact be applied, in accordance with the invention, to all measured values that are obtained by a measuring process that can be represented by applying a linear operation to values of properties that are to be determined. The linear operation corresponds to the term $\Sigma A_{lj}\mu_j^k$ and is, as described above, a sum of values of a property that contribute to the given measured value and have been multiplied by proportional factors. The values of the property may define any physical property of an object and the proportional factors each define a measure giving the proportion that a value of a property forms of the measured value.

After the above insertion, the description of the method according to the invention will now continue.

In step 105, a part of the examination region that is to be reconstructed, or in other words in which the spatial distribution of the absorption is to be determined, is first selected. This part will be referred to below as the FOV (field of view). It is also specified how many voxels the FOV is to be represented by. An FOV of 20×20×20 cm$^3$ may, for example, be represented by 512$^3$ voxels. Each voxel also has assigned to it an iteration value that is a starting value. In the present embodiment, the starting value of each iteration value is equal to zero.

In step 107, that set of projections is determined whose rays passed through the FOV defined in step 105 during the measurement process. In this case, a projection comprises all the rays that started from the same position in the radiation source.

In step 109, a sequence is defined in which the projections determined in step 107, or rather the corresponding measured values, are looked at in the following steps to allow the distribution of absorption in the FOV to be reconstructed. The sequence in question may be a random sequence or it may be arranged by time of acquisition. It may, however, also be so designed that the projections that have already been used for reconstruction at the time are distributed as evenly as possible across the entire angular range. The next steps 111 to 119 define an iteration step and each relate to the projection that is current at the time in the sequence or rather to the corresponding measured values.

In step 111, it is first determined, for each ray in the current projection, which voxels this ray passed through in the FOV during the measurement process. The iteration values of those voxels through which the given ray in the projection passed are added up to give a reference measured value, which means that a reference measured value is obtained for each ray in the projection that passed through the FOV. This determination of reference measured values by simulating the passage of rays through the FOV is referred to as forward projection. It is defined in equation (5) by the term $\Sigma A_{ij}\mu_j^k$, with the matrix A having only zeroes and ones in the present embodiment. The zeroes and ones are so distributed that the corresponding iteration values are added up for each reference measured value. So, if for example the ray that produced the mth measured value $p_m$ passes through only the values of absorption at points $x_i$, $x_j$ and $x_k$, the first row of the matrix A has a one at each of the ith, jth and kth points and a zero at each of the other points.

In other embodiments, account may be taken of the fact that a ray does not pass through every voxel in the same way. What this means is that a ray impinges on, for example, the center of certain voxels whereas in other voxels the same ray passes only through a corner region of the voxel. This results in the values of absorption assigned to the voxels making different contributions to the measured value. Values of absorption for voxels that the ray passes through centrally make a greater contribution to the relevant measured value than those for voxels that the ray passes through only in corner regions. This can be allowed for by, during the forward projection, multiplying each value of absorption by an appropriate proportional factor before it is added to the reference measured value. This proportional factor may, for example, be proportional to the length of the line of intersection that is found as the amount of intersection between the given voxel and the given ray, i.e. to the area of intersection that is found, if the ray is assumed to be of a finite width. The proportional factor corresponds to the term $A_{ij}$ in equation (5).

In step 113, the difference is formed between the reference measured values in the current projection and the corresponding measured values that were actually detected in this projection. This difference corresponds to the term $p_l - \Sigma A_{ij}\mu_j^k$ in equation (5), i.e. $p_l$ is the measured value detected and $\Sigma A_{ij}\mu_j^k$ is the corresponding reference measured value.

The particular difference is referred to as the measured value difference. Because a ray produces a measured value, and because the measured values can be taken and reference measured values and measured value differences determined from them, the ray, the measured value, the reference measured value and the measured value difference form a unit. If it is therefore said, in the context of the present invention, that a measured value difference for example "belongs" to a ray, what is meant is at the measured value difference has been produced by finding the difference between a reference measured value and a measured value and that it was the ray concerned that caused this measured value.

In step 115, the measured value differences in a projection that were determined in step 113 are multiplied by a reliability parameter $\lambda_l$. This reliability parameter may be different for each measured value difference or measured value $p_l$ and is larger the greater the reliability of the particular measured value. It may take account of the noise that varies from measured value to measured value, such as the Poisson noise, but also, as has already been described above, for the differing amounts of movement by an object. A reliability parameter that allows for differing amounts of movement by the object may, for example, be a function of the distance in time between the point in time at which a measured value is acquired and a preset reference point in time, it being assumed that the movement of the object is relatively small at the reference point in time. The reliability parameter could be all the larger, the smaller this distance in time is. What is more, measured values that are falsified by unwanted stray radiation may also have a lower reliability than measured values that are less severely affected by unwanted stray radiation.

In the present embodiment, $\lambda_l$ is given by the equation $$\lambda_l = c\exp(-p_l/2) \qquad (6)$$

to enable the disruptive effect that Poisson noise has on the quality of the image being reconstructed to be reduced. In this equation, c is a discretionary constant that is the same for all the measured values. The constant c can be varied to affect the relaxation rate of the method. To reduce the effect that the noise affecting measured values has, any reliability parameter may be used that is larger the less the relevant measured value is affected by noise. Allowance can also be made for different types of noise. In this way, not only Poisson noise but also electronic noise in the detector unit may be allowed for.

In step 117, each measured value difference in the current projection is divided by the normalization factor $\Sigma A_{ij}^2$, i.e. by the sum of the squares of those proportions of the values of absorption $\mu_j$ corresponding to the values $\mu_j^k$ which there are in the measured value $p_l$. Because the matrix A has only ones and zeroes that are distributed as described above, what this means in the present embodiment is that the sum $\Sigma A_{ij}^2$ is equal to the number of voxels through which the ray belonging to the given measured value difference passes.

If, in other embodiments, account was taken during the forward projection, as described above, of the fact that the values of absorption may make contributions of different sizes to the measured value, by for example causing the lines or areas of intersection of the given ray with the voxels to be allowed for in the form of proportions $A_{ij}$, then the same matrix elements or proportional factors $A_{ij}$ must also be used in step 117 in forming the sum $\Sigma A_{ij}^2$.

The difference values in the current projection, having been multiplied by the reliability factor and normalized, are backward projected into the FOV in the next step 119.

For each voxel in the FOV through which the current projection is transmitted, it is determined where, if a ray starts from the position in the radiation source that produced the current projection and passes through the center of the selected voxel, this ray will impinge on the detector. If the ray impinges on the center of a detector element, then the measured value difference that corresponds to this detector element is added to the iteration value for the given voxel. If the ray does not impinge on the center of a detector element, an appropriate measured value difference is obtained by interpolation from the measured value differences for adjacent detector elements, and the interpolated measured value difference is added to the iteration value for the given voxel.

If, in other embodiments, in the forward projection in step 111 and in the normalization in step 117 the proportion that the value of absorption $\mu_j$ corresponding to the iteration value $\mu_j^k$ forms of the measured value $p_l$ is not, as it is in the present embodiment, equal to zero or one, then each measured value difference must be multiplied, before the backward projection, by a proportional factor that corresponds to the proportion that the value of absorption belonging to the voxel that is to be updated forms of the ray that passes through the center of this voxel. If for example, as described above, the proportional factor corresponds to the line or area of intersection of the voxel that is to be updated with that ray in the projection which passes through the voxel, then the measured value difference corresponding to the ray must be multiplied by this proportional factor before the backward projection.

In other embodiments, the backward projection of the measured value differences in step 119 could be carried out as follows. For each measured value in the current projection, those voxels are determined through which the ray belonging to the measured value passes. In a step, the measured value difference that belongs to the given ray and was determined in step 117 is added to each of these voxels. If the proportional factors are not either zero or one, then, before the addition to a voxel, the measured value difference is multiplied by a proportional factor that corresponds to the proportion that the relevant voxel or value of absorption forms of the measured value belonging to the measured value difference.

In step 121, a check is made to see whether all the projections determined in step 107 have passed through steps 111 to 119 the same number of times. If they have not, the method continues, in step 111, with the projection that is next in the sequence determined in step 109. Otherwise, a check is made in step 123 to see whether a break-off criterion has been satisfied. The break-off criterion may, for example, be satisfied if steps 111 to 119 have been performed a preset number of times on all the projections, or if the sum of the squares of all the measured value differences drops below a preset threshold value. If the break-off criterion is not satisfied, then the method continues in step 111 with the projection that is the first in the sequence determined in step 109. If on the other hand the break-off criterion is satisfied, then the method comes to an end (step 125).

In other embodiments, the sequence of the projections need not be determined as in step 109. Before a forward projection for a projection is carried out in step 111, a projection could also be selected each time, randomly for example, from those selections which have passed through steps 111 to 119 the smallest number of times.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

LIST OF REFERENCE NUMERALS $\alpha_{max}$ Included angle
$\lambda_l$ Reliability parameter
$\mu_j$ Value of a property
$\mu_j^k$ Iteration value
$p_l$ Measured value
$A_{lj}$ Proportional factor
S Radiation source
1 Gantry
2, 5 Motor
3 Collimator arrangement
4 Conical beam of rays
7 Control unit
10 Reconstructing and image-processing computer
11 Monitor
13 Examination region
14 Axis of rotation
16 Detector unit

The invention claimed is:

1. An iterative method of determining a spatial distribution of values ($\mu_j$) of a property of an object, and particularly values of its absorption, in an examination region, starting from measured values ($p_l$) that are first acquired with a measuring device, and particularly with a computer tomograph, wherein the measured values ($p_l$) can each be represented as a sum of values ($\mu_j$) of a property that have each been multiplied by a proportional factor ($A_{lj}$), which measured values are divided into groups, and wherein the proportional factor ($A_{lj}$) is a measure of the proportion that a value ($\mu_j$) of the property forms of the measured value ($p_l$), and each value ($\mu_j$) of the property is approached by one iteration value ($\mu_j^k$) at a time by setting each iteration value ($\mu_j^k$) to a starting value and performing the following steps at least once on each group of measured values ($p_l$) until a stop criterion is satisfied:
 a) generating a reference measured value for each measured value ($p_l$) in the given group, by multiplying each iteration value ($\mu_j^k$) whose value ($\mu_j$) of the property forms a proportion of the given measured value by a proportional factor ($A_{lj}$) and by adding up the iteration values that are multiplied by the given proportional factor ($A_{lj}$),
 b) generating a measured value difference for each measured value ($p_l$) in the given group by forming the difference between the given measured value ($p_l$) and the corresponding reference measured value,
 c) for each measured value ($p_2$) selecting a corresponding reliability parameter ($\lambda_l$) and multiplying each measured value difference by the corresponding reliability parameter ($\lambda_l$), the greater the reliability of that measured value ($p_l$), the larger the corresponding reliability parameter ($\lambda_l$),
 d) dividing each measured value difference that has been multiplied by the reliability parameter ($\lambda_l$) by a normalizing factor that is dependent on the proportional factors of those values of the property which form a proportion of that measured value which belongs to the measured value difference,
 e) updating the distribution by backward projection of the measured value differences obtained in step d) into the examination region.

2. An iterative method as claimed in claim 1, wherein the break-off criterion is satisfied when steps a) to e) have been performed a preset number of times on all the groups or when the sum of the squares of all the measured value differences is less than a preset threshold value.

3. An iterative method as claimed in claim 1, wherein the reliability of a measured value ($p_l$) is greater the less this measured value is affected by noise.

4. An iterative method as claimed in claim 1, wherein the reliability of a measured value ($p_l$) is greater the fewer movements there are on the part of the object in the examination region during the acquisition of this measured value.

5. An iterative method as claimed in claim 1, wherein the acquisition of measured values ($p_l$) comprises:
 generating, with a radiation source, a beam of rays that passes through an examination region,
 producing a relative movement between the radiation source on the one hand and the examination region on the other hand, in which case a trajectory along which the radiation source advances relative to the examination region extends over the surface of an imaginary cylinder or sphere enclosing the object, and
 acquiring, with a detector unit and during the relative movement, measured values ($p_l$) that depend on the intensity in the beam of rays on the farther side of the examination region.

6. An iterative method as claimed in claim 5, wherein, in step a), the generation of a reference measured value is carried out by means of a forward projection.

7. An iterative method as claimed in claim 6, wherein, to determine a spatial distribution of values of absorption, the examination region is represented by a set of voxels, each voxel having an iteration value assigned to it, each value of absorption being approached by one iteration value at a time, each iteration value being set to a starting value, and the generation in step a) of a reference measured value for a measured value in a group by means of a forward projection having the following steps:
   determining the path of that ray in the beam of rays which caused the measured value,
   determining those voxels through which the ray passes,
   multiplying the iteration values assigned to these voxels by, in each case, a proportional factor that is equal to the proportion that the value of absorption corresponding to the iteration value forms of the measurement,
   adding up the iteration values that are assigned to these voxels and have been multiplied by a proportional factor, the resulting sum being the reference measured value.

8. An iterative method as claimed in claim 7, wherein, in step e), by means of a backward projection of those measured value differences for a group which were obtained in step d), those voxels are updated through which were transmitted the rays that belong to the measured values in the group, and in that the updating of a voxel has the following steps:
   determining a ray that, starting from the position in the radiation source of the projection, extends through the voxel to be updated,
   determining a point of impingement of this ray on the detector unit and determining a measured value difference belonging to this ray with the help of the point of impingement,
   multiplying the measured value difference determined, by a proportional factor that is equal to the proportion that is formed, by the value of absorption that is approached by the voxel to be updated, of the measured value that belongs to the ray determined,
   adding the measured value difference to the iteration value that is assigned to the voxel to be updated.

9. A computer tomograph, having
   a radiation source for generating a beam of rays that passes through an examination region,
   a drive arrangement to cause an object situated in the examination region and the radiation source to be rotated relative to one another about an axis of rotation and/or to be displaced relative to one another parallel to the axis of rotation,
   a detector unit coupled to the radiation source, for acquiring measured values,
   at least one reconstructing and image-processing computer for reconstructing the spatial distribution of the absorption within the examination region from the measured values acquired by the detector unit, and
a control unit for controlling the radiation source, the drive arrangement, the detector unit and the at least one reconstructing and image-processing computer in the following steps:
   generating, by means of a radiation source, a beam of rays that passes through an examination region,
   producing a relative movement between the radiation source on the one hand and the examination region on the other hand, in which case a trajectory along which the radiation source advances relative to the examination region extends over a surface of an imaginary cylinder enclosing the object,
   acquiring, with a detector unit and during the relative movement, measured values ($p_i$) that depend on the intensity in the beam of rays on the farther side of the examination region, in which case the measured values ($p_i$) can each be represented as a sum of values ($\mu_j$) of a property, and particularly values of absorption, that have each been multiplied by a proportional factor ($A_{ij}$), and the proportional factor ($A_{ij}$) is a measure of the proportion that a value of the property forms of the measured value ($p_i$),
   determining a spatial distribution of the values ($\mu_j$) of the property in the examination region from the measured values ($p_i$), the measured values ($p_i$) being divided into groups and each value ($\mu_j$) of the property being approached by one iteration value ($\mu_j^k$) at a time by setting each iteration value ($\mu_j^k$) to a starting value and performing the following steps at least once on each group of measured values ($p_i$) until a break-off criterion is satisfied:
   a) generating a reference measured value for each measured value ($p_i$) in the given group, by multiplying each iteration value ($\mu_j^k$) whose value ($\mu_j$) of the property forms a proportion of the given measured value ($p_i$) by a proportional factor ($A_{ij}$) each time, and by adding up the iteration values that are multiplied by the given proportional factor ($A_{ij}$),
   b) generating a measured value difference for each measured value ($p_i$) in the given group by forming the difference between the given measured value ($p_i$) and the corresponding reference measured value,
   c) multiplying each measured value difference by a corresponding reliability parameter ($\lambda_i$), the greater the reliability of that measured value ($p_i$) the larger the corresponding reliability parameter (($\lambda_i$),
   d) dividing each measured value difference that has been multiplied by a reliability parameter ($\lambda_i$) by a normalizing factor that is dependent on the proportional factors ($A_{ij}$) of those values ($\mu_j$) of the property which form a proportion of the measured value ($p_i$) belonging to the measured value difference,
   e) updating the distribution by backward projection of the measured value differences obtained in step d) into the examination region.

10. A computer readable medium encoded with a computer program for a control unit for controlling a radiation source, a drive arrangement, a detector unit and at least one reconstructing and image-processing computer of a computer tomograph in to perform the following steps:
   generating, with a radiation source, a beam of rays that passes through an examination region,
   producing a relative movement between the radiation source on the one hand and the examination region on the other hand, in which case a trajectory along which the radiation source advances relative to the examination region extends over a surface of an imaginary cylinder enclosing the object,
   acquiring, with a detector unit and during the relative movement, measured values ($p_i$) that depend on the intensity in the beam of rays on the farther side of the examination region, in which case the measured values ($p_i$) can each be represented as a sum of values ($\mu_j$) of a property, and particularly values of absorption, that have each been multiplied by a proportional factor ($A_{ij}$), and the proportional factor ($A_{ij}$) is a measure of the proportion that a value ($\mu_j$) of the property forms of the measured value ($p_i$),
   determining a spatial distribution of the values ($\mu_j$) of the property in the examination region from the measured values ($p_i$), the measured values ($p_i$) being divided into groups and each value ($\mu_j$) of the property being approached by one iteration value ($\mu_j^k$) at a time by setting each iteration value ($\mu_j^k$) to a starting value and performing the following steps at least once on each group of measured values ($p_i$) until a break-off criterion is satisfied:
   b) generating a measured value difference for each measured value ($p_i$) in the given group by forming the difference between the given measured value ($p_i$) and the corresponding reference measured value, c) multiplying each measured value difference by a reliability parameter ($\lambda_l$) whose magnitude varies with the reliability of that measured value ($p_l$) in the group which belongs to the given measured value difference, the more reliable the measured value ($p_l$), the greater the magnitude of the corresponding reliability parameters, d) dividing each measured value difference that has been multiplied by the reliability parameter ($\lambda_l$) by a normalizing factor that is dependent on the proportional factors ($A_{lj}$) of those values ($\mu_j$) of the property which form a proportion of the measured value ($p_l$) belonging to the measured value difference, e) updating the distribution by backward projection of the measured value differences obtained in step d) into the examination region.

* * * * *